March 16, 1943.       W. N. DE SHERBININ         2,313,737
DEVICE FOR VIEWING TRANSPARENT OBJECTS
Filed Oct. 26, 1939         3 Sheets-Sheet 1
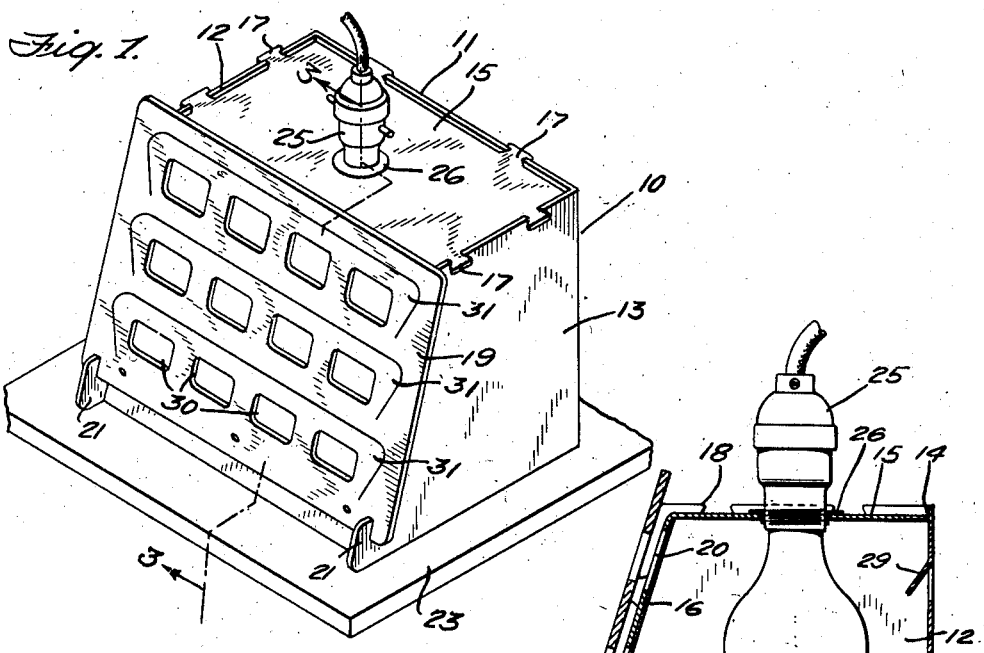
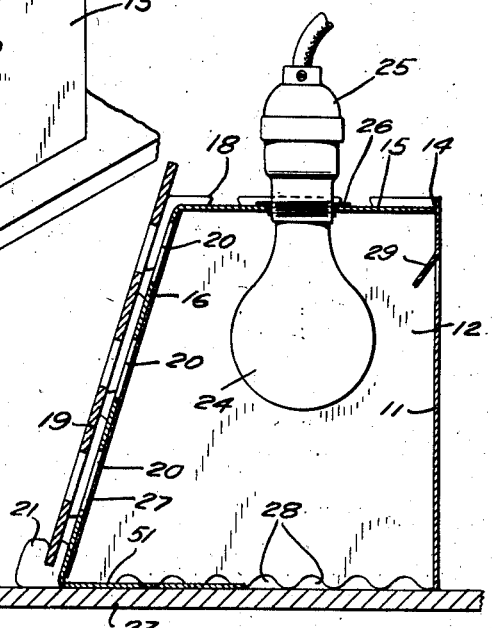
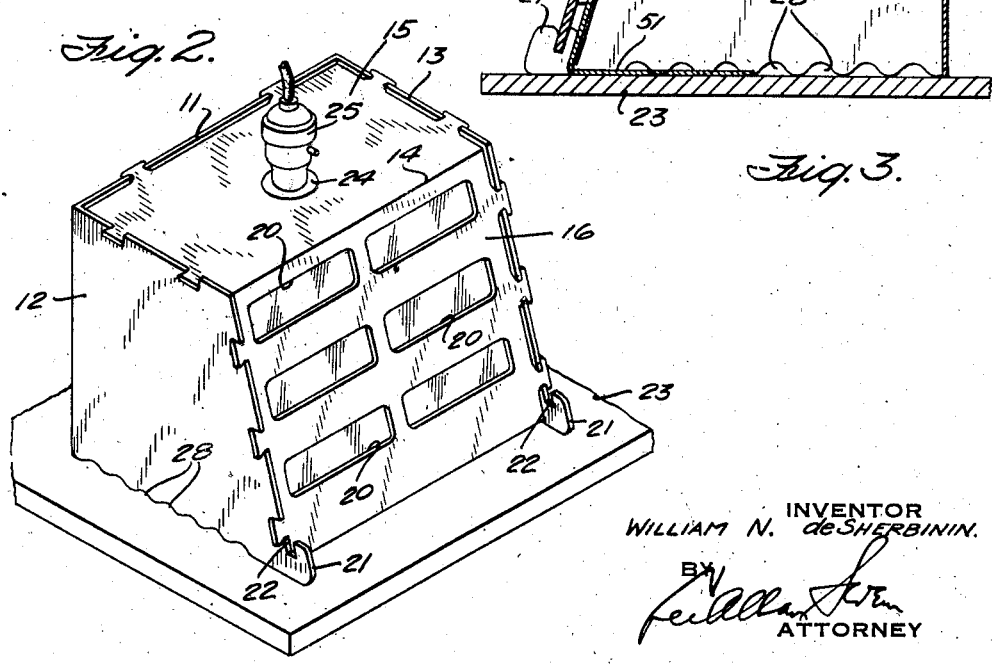
INVENTOR
WILLIAM N. deSHERBININ.
BY
ATTORNEY

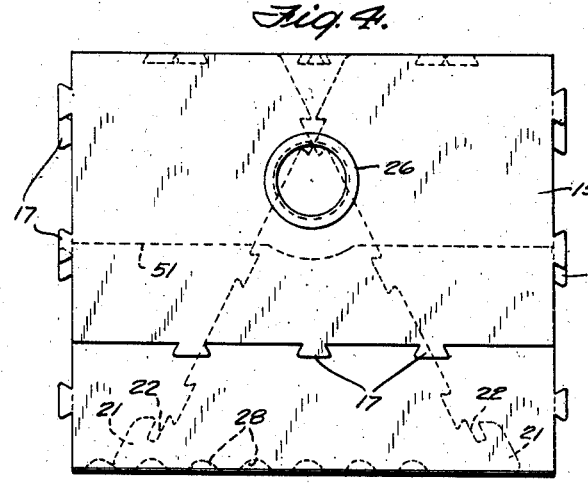
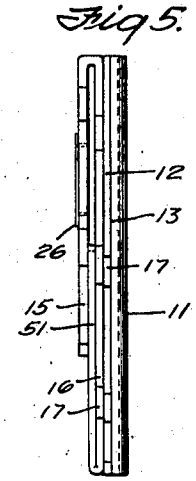
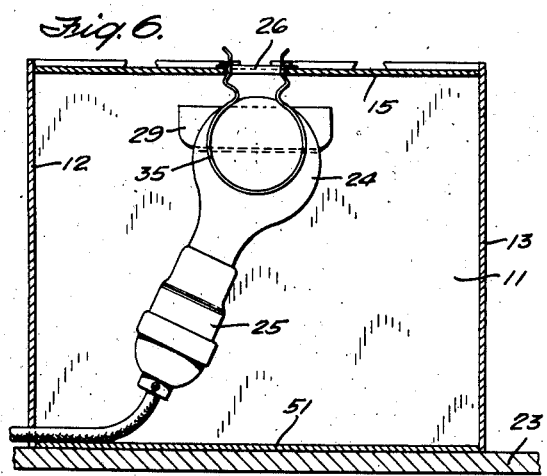
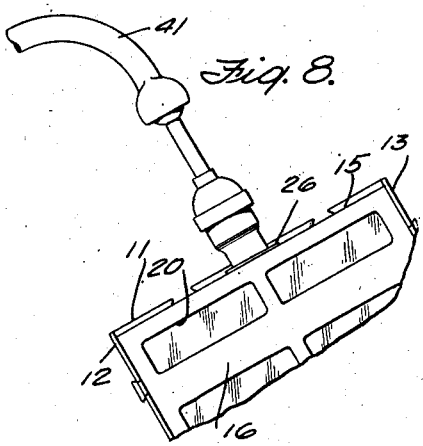
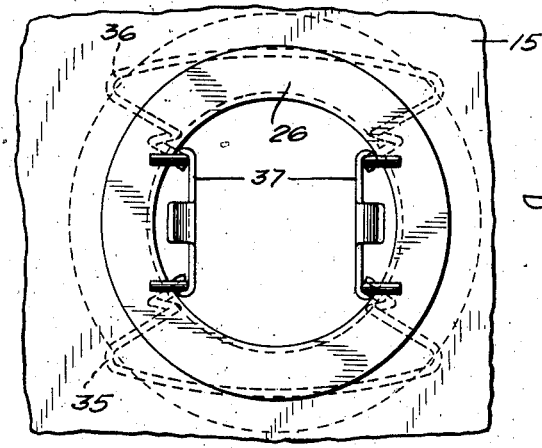

March 16, 1943. W. N. DE SHERBININ 2,313,737
DEVICE FOR VIEWING TRANSPARENT OBJECTS
Filed Oct. 26, 1939   3 Sheets-Sheet 3
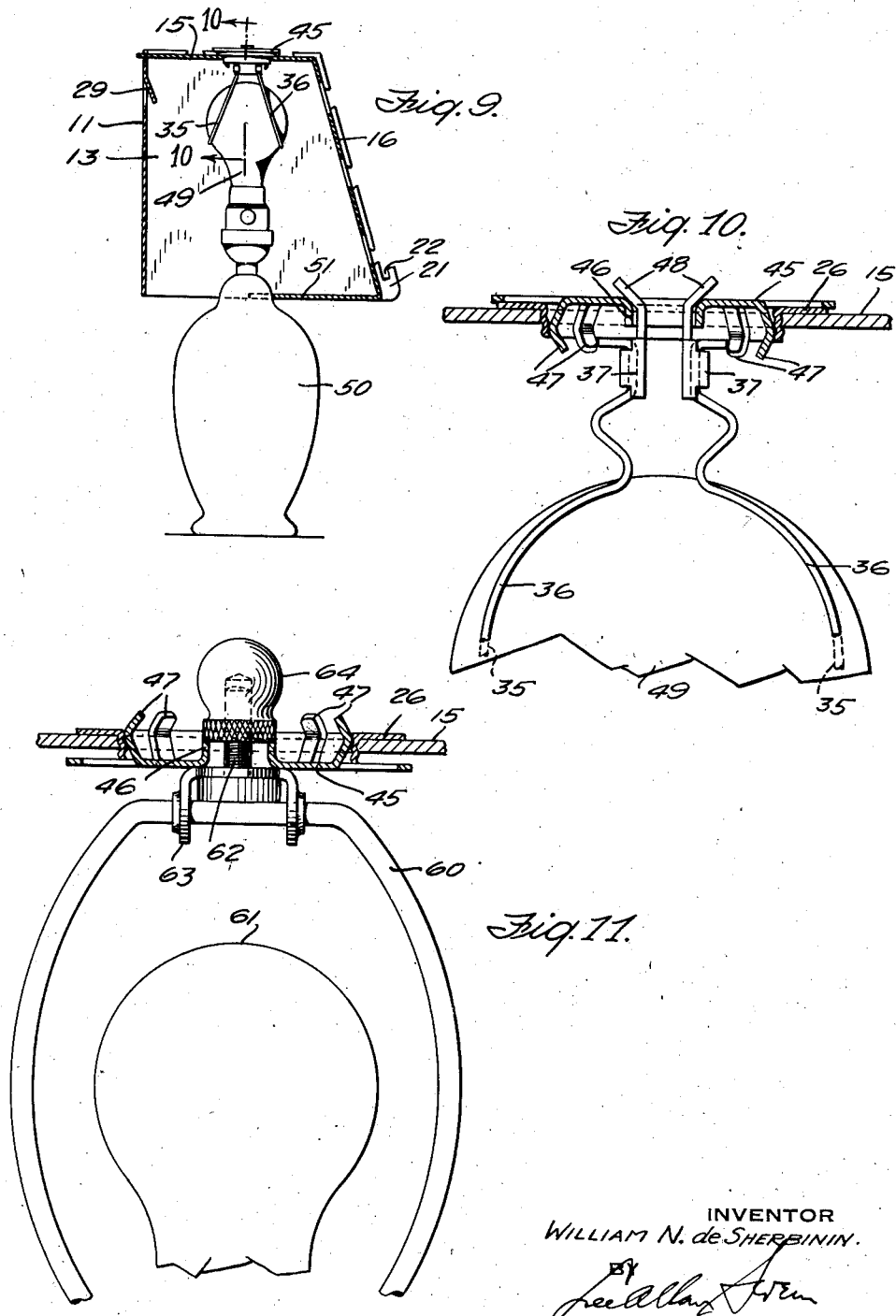
INVENTOR
WILLIAM N. de SHERBININ.
ATTORNEY Patented Mar. 16, 1943

2,313,737

UNITED STATES PATENT OFFICE 2,313,737

DEVICE FOR VIEWING TRANSPARENT OBJECTS

William N. de Sherbinin, Mount Kisco, N. Y.

Application October 26, 1939, Serial No. 301,451

19 Claims. (Cl. 40—132)

This invention relates to devices for viewing transparent objects. Although the invention is capable of general application to all transparent objects or those of partial transparency, it is particularly well adapted to the viewing of photographic films, and especially color films.

The viewer is arranged so that it may be mounted readily and conveniently on any standard lamp, whether a table, bridge or floor lamp, or it may rest on a table, shelf, or other supporting device, in which event an ordinary electric light bulb furnishes the required illumination. The viewer also is arranged to be folded into a small space when not in use, so that it may be transported or stored conveniently. When used for viewing films, the film is displayed in such manner that all of the color, composition and perspective inherent in the films is brought out vividly.

Other features and advantages of the invention will be apparent from the following description when considered in connection with the accompanying drawings forming a part thereof, and in which:

Fig. 1 is a perspective view of a viewer embodying the invention with film holding means in position thereon;

Fig. 2 is another perspective view of the viewer without the film holding means;

Fig. 3 is a vertical sectional view of the viewer taken on line 3—3 of Fig. 1;

Fig. 4 is an elevational view of the viewer in folded condition;

Fig. 5 is an end view of the viewer in folded condition;

Fig. 6 is a vertical sectional view of the viewer showing another disposition of the illuminating means;

Fig. 7 is a top plan view of the viewer shown in Fig. 6;

Fig. 8 is an elevational view of the viewer mounted on an electric light wall fixture or bridge lamp;

Fig. 9 is a vertical sectional view of the viewer mounted on a table lamp;

Fig. 10 is a sectional view on an enlarged scale, on line 10—10 of Fig. 9, and

Fig. 11 is a vertical sectional view showing the manner in which the viewer is mounted on a harp type lamp fixture and on a floor lamp.

Like characters of reference refer to the same or to similar parts throughout the several views.

In the embodiment of the invention selected for illustration, two completely separable parts, each having a plurality of foldable sections, compose the body of the viewer and enclose the illuminating area within the viewer. It will be understood however, that the viewer may be made in a single part or in more than two parts without departing from the principles of the invention. In the form shown, the viewer is of box-like configuration with an open bottom. Part 10 has a central section 11 providing the rear wall of the viewer and sections 12 and 13 which provide the sides of the viewer. The sections 12 and 13, in the form shown, are integral with and foldable upon, the central section 11. Part 14 has a section 15 which provides the top of the viewer and a section 16 which provides the front wall thereof. Sections 15 and 16 are integral and are foldable upon each other. Suitable means are provided to detachably secure the two parts 10 and 14 together. As shown, such means comprises a plurality of cooperating lugs and notches, the lugs 17 being integral with and extending laterally from the sections 15 and 16, and being received in notches 18 in the sections 11, 12 and 13. Both the lugs 17 and the notches 18 are dove-tail in configuration, providing an interlocking arrangement which will not separate accidentally, but which may be parted and joined readily and conveniently when desired. The front wall 16 is vertically inclined as shown, to permit the film holding means 19 to rest in position on the viewer. This wall 16 is provided with apertures 20 with which the films to be viewed register, and through which the light passes from the illuminating means. The lower front portions of the side sections 12 and 13 are provided with an extension 21 having a notch 22 which receives the lower edge portion of the film holding means 19. In the form shown in Figs. 1 to 3, the viewer rests on a table, shelf or the like 23, and the illuminating means, consisting of an electric light bulb 24 in a socket 25, is supported on the top section 15 of the viewer. The top section has a centrally placed circular aperture in which is received the threaded cylindrical portion of an annular adapter 26, and into which the end of the socket 25 is threaded, the position of the socket being such that the bulb 24 is supported within the viewer. A light diffuser 27, of paper, plastic or other suitable material, is affixed to the inner face of the front wall 16 and extends at least over all of the apertures 20. The lower edge of the side wall 12 is scalloped to provide air openings 28, and the upper portion of the rear wall 11 is provided with a flap 29 which may be moved to open position to permit the circulation of air through the viewer.

The embodiment of the viewer illustrated, is arranged for use with a film holding means of my invention which is disclosed in my application Serial No. 294,692, filed September 13, 1939. This holding means constitutes a file for films and for cardboard mounted film, and in general consists of a panel having a plurality of pockets 30 for films, arranged in rows, each pocket being apertured to permit light to pass through the pocket and the film disposed therein, each row of pockets having a movable cover or flap 31 which permits access to the pockets and to the film therein. The apertures 20 in the front wall 16 of the viewer are arranged and disposed to register with the apertures in the pockets 30 of the film holding means 19. Obviously, other film holding means may be employed, in which event the apertures 20 may be arranged and disposed differently.

In use, assuming that the viewer is in folded condition as shown in Figs. 4 and 5, the two parts are unfolded and secured together to form the box-like structure shown in Figs. 1 to 3. The electric light socket 25 is threaded into the annulus 26 and the bulb 24 is threaded into the socket, and the current is turned on to provide the required illumination within the viewer. The flap 29 is moved to open position to provide for circulation of air through the interior of the viewer to dissipate the heat generated by the bulb 24. With the viewer resting on a table or shelf or the like 23, a panel 19 is placed in front of the front wall 16 of the viewer and the light shining through the apertures 20 and through the pockets 30 and the film therein, will display the film very vividly. When the film in the panel 19 has been viewed for a sufficient length of time, the panel is removed and another panel with other films therein is placed in front of the viewer for viewing, and so on.

It will be observed that the front edges of the side walls 12 and 13 extend a short distance forwardly of the front or outer face of the front wall 16, and that the panel 19 rests against these edges thereby being maintained in spaced relationship with the front wall 16. In this position, the film in the panel 19 appears to have the characteristics of three dimensional reality, thus enhancing the display of the film. After the film has been viewed, the bulb and socket are removed, the two sections are disconnected and folded as shown in Figs. 4 and 5.

The viewer may be made of any suitable material. Preferably, it is made of heavy cardboard, lined in brilliant white, with an exterior of deep black.

Figs. 6 and 7 illustrate how the bulb and socket may be supported entirely within the viewer. This is accomplished by the use of an adapter of my invention which is disclosed and claimed in my Patents No. 1,903,985, granted April 18, 1933, and No. 2,103,322, granted December 28, 1937. In general, this type of adapter comprises spaced loops 35 and 36 of spring metal or spring wire, which engage opposite portions of the bulb 24 and which are joined together at their upper ends by two metal plates 37 which are arranged to engage the inner periphery of the annulus 26 at different elevations. The resiliency of the metal or wire of the loops, maintains the adapter in contact with the bulb and with the annulus 26. In this manner, the bulb and socket are supported from the top 15 of the viewer.

Fig. 8 illustrates the manner in which the viewer is supported from a bridge lamp or from a wall electric light fixture. The threaded cylindrical portion of the annulus 26 is threaded on the lower threaded end of the socket 40 of the fixture 41 and thus takes the place of the lamp shade. In this instance, the annulus 26 may be positioned with respect to the top 15 of the viewer, as shown in Figs. 1 to 3, or the ring-like portion thereof which is not threaded, may be positioned in engagement with the inner wall of the top 15.

Figs. 9 and 10 show how the viewer may be mounted on, and supported by, the electric light bulb of a table lamp. This is accomplished by the use of the type of adapter shown in Figs. 6 and 7, and also with the use of another adapter 45 of my invention which is disclosed and claimed in my Patent No. 1,985,488, granted December 25, 1934. The adapter 45, as shown, comprises a circular metallic disc having a central aperture with a cylindrical wall 46 extending from the lower side of the disc. A plurality of lugs 47 are struck out of the metal of the disc on a circle which is concentric with the aperture in the disc. These lugs 47 engage the inner periphery of the threaded portion of the annulus 26 with sufficient friction to retain the adapter in engagement therewith. The upper ends 48 of the plates 37 extend through the aperture in the disc and support the viewer from the bulb 49 of the table lamp 50. If desired, the adapter 45 may be omitted, in which event the upper ends of the loops 35 and 36, or the plates 37, will engage the annulus 26.

In order to prevent tilting of the viewer with respect to the lamp upon which it is supported by the bulb engaging adapter, a supporting section 51 is provided which is integral with the front wall 16 of the viewer. As shown in Fig. 9, the supporting section 51 is connected with, or extends from the lower edge of, the front wall 16 at one end, and engages the upper portion of the base of the lamp 50 at its other end. The inner end of the section 51 may be shaped as desired to engage the lamp base or the lamp socket, or any other portion of the lamp to prevent tilting of the viewer. The section 51 may be as wide or as narrow as desired for the purpose intended. If it extends for the full width of the viewer, it will cut off some of the light from the bulb 49 and thus serve to provide a darker background for the use of the viewer. When the viewer is in folded condition, the supporting section 51 will fold against the inner or the outer face of the front wall 16 in the manner shown in Fig. 5.

Fig. 11 shows the manner in which the viewer is mounted on a table lamp having a so-called "harp" fixture 60 which is supported below the socket of the bulb 61. The fixture 60 carries a threaded stud 62 which is secured in position by the inverted U-shaped member 63. An adapter 45 is utilized in the position shown in Fig. 11, and the viewer is placed in position with the stud 62 projecting through the central aperture in the adapter 45. A nut or finial 64, threaded on the stud until it engages the adapter 45, holds the viewer securely in place on the lamp. Floor lamps usually have a fixture which is provided with an upwardly extending threaded stud like stud 62, so that the viewer can be mounted on floor lamps in the same manner that they are mounted on lamps having "harp" fixtures.

It will be perceived that viewers embodying the invention may be used wherever it is convenient to use them. If it is desired to use the illuminating means of an electric light lamp, it is necessary only to remove the shade on the lamp and to mount the viewer on the lamp bulb or on the lamp in the manner disclosed.

Since changes may be made in the form, location and relative arrangement of the several parts of the viewer without departing from the principles of the invention, it will be understood that the invention is not to be limited excepting by the scope of the appended claims.

What is claimed is:

1. A device for viewing transparent objects comprising a hollow box-like body having two cooperating, substantially opaque parts provided with means on adjoining edge portions of the parts for detachably securing the parts together to form the body, one part providing three hingedly connected side walls for the body and the other part providing a top wall and another side wall hingedly connected together, means connected with one of the walls of the body and constructed and arranged to engage illuminating means disposed within the body, to support the device on the illuminating means, one side wall having an aperture through which light passes from the interior of the body, and means on the body providing a support outside said one side wall of the body and in alignment with the aperture therein for a transparent object free of connection with said body.

2. A device for viewing transparent objects comprising a hollow box-like body having two cooperating, substantially opaque parts provided with means on adjoining edge portions of the parts for detachably securing the parts together to form the body, one part providing three hingedly connected side walls for the body and the other part providing a top wall and another side wall hingedly connected together, means connected with one of the walls of the body and constructed and arranged to engage illuminating means disposed within the body, one side wall having an aperture through which light passes from the interior of the body, opposite side walls adjoining said one side wall of the body having portions extending outwardly beyond the outer face of said one side wall, and means on said opposite side walls providing a support for a transparent object outside said one side wall in engagement with the outwardly extending portions of said opposite side walls and in alignment with and spaced from the aperture therein.

3. A device for viewing transparent objects comprising a hollow box-like body having two cooperating, substantially opaque parts provided with means on adjoining edge portions of the parts for detachably securing the parts together to form the body, one part providing three hingedly connected side walls for the body and the other part providing a top wall and another side wall hingedly connected together, means connected with one of the walls of the body and constructed and arranged to engage illuminating means disposed within the body, one side wall having an aperture through which light passes from the interior of the body, opposite side walls adjoining said one side wall of the body having portions extending outwardly beyond the outer face of said one said wall, and means on said opposite side walls providing a support for means for holding a transparent object in alignment with and spaced from the aperture in said one side wall so that light from said body will pass through said aperture and said transparent object with said holding means in engagement with the outwardly extending portions of said opposite side walls.

4. A device for viewing transparent objects comprising a hollow box-like body having a plurality of cooperating, substantially opaque parts provided with means on adjoining edge portions of the parts for detachably securing the parts together to form the body, each part providing at least one substantially plane wall for the body, means connected with one of the walls of the body and constructed and arranged to engage illuminating means disposed within the body, a side wall having an aperture through which light passes from the interior of the body, light diffusing means covering said aperture, opposite side walls adjoining said apertured side wall having portions extending outwardly beyond the outer face of the apertured wall, and means on said opposite side walls providing a support for means for holding a transparent object in alignment with and spaced from the aperture in said wall so that light from said body will pass through said aperture and said transparent object with said holding means in engagement with the outwardly extending portions of said opposite side walls.

5. A device for viewing transparent objects comprising a hollow box-like body having a plurality of cooperating, substantially opaque parts provided with means for detachably securing the parts together to form the body, each part providing a plurality of hingedly connected substantially plane walls for the body, means connected with one of the walls of the body and constructed and arranged to engage illuminating means disposed within the body, a side wall having an aperture through which light passes from the interior of the body, and opposite side walls adjoining said apertured wall having portions extending outwardly beyond the outer face of said apertured wall to provide supports for a transparent object in alignment with the aperture in said wall.

6. A device for viewing transparent objects comprising a hollow box-like body having a plurality of cooperating, substantially opaque parts provided with means for detachably securing the parts together to form the body, each part providing a plurality of hingedly connected substantially plane walls for the body, means connected with one of the walls of the body and constructed and arranged to engage illuminating means disposed within the body, a side wall having an aperture through which light passes from the interior of the body, and opposite side walls adjoining said apertured wall having portions extending outwardly beyond the outer face of said apertured wall at the lower portion of the opposite side walls to provide supports for a transparent object in alignment with the aperture in said wall, each support having a notch in its upper portion.

7. A device for viewing transparent objects comprising a hollow box-like body having a plurality of cooperating, substantially opaque parts provided with means for detachably securing the parts together to form the body, each part providing a plurality of hingedly connected substantially plane walls for the body, means connected with one of the walls of the body and constructed and arranged to engage illuminating means disposed within the body, a side wall having an aperture through which light passes from the interior of the body, and opposite side walls adjoining said apertured wall having portions extending outwardly beyond the outer face of said apertured wall, parts of said outwardly extending portions providing supports for a transparent object outside the apertured wall in engagement with said outwardly extending portions of said opposite side walls and in alignment with and spaced from the aperture therein.

8. A device for viewing transparent objects comprising a hollow box-like body having two cooperating, substantially opaque parts provided with means on adjoining edge portions of the parts for detachably securing the parts together to form the body, one part providing three hingedly connected side walls for the body and the other part providing a top wall and another side wall hingedly connected together, means connected with one of the walls of the body and constructed and arranged to engage illuminating means disposed within the body, a side wall having an aperture through which light passes from the interior of the body, and opposite side walls adjoining said apertured wall having portions extending outwardly at the lower parts thereof beyond the outer face of the apertured wall to provide supports for a transparent object in alignment with the aperture in said wall.

9. A device for viewing transparent objects comprising a hollow box-like body having two cooperating, substantially opaque parts provided with means on adjoining edge portions of the parts for detachably securing the parts together to form the body, one part providing three hingedly connected side walls for the body and the other part providing a top wall and another side wall hingedly connected together, means connected with one of the walls of the body and constructed and arranged to engage illuminating means disposed within the body, a side wall having an aperture through which light passes from the interior of the body, and opposite side walls adjoining said apertured wall having portions extending outwardly beyond the outer face of said apertured wall, parts of said outwardly extending portions providing supports for a transparent object outside the apertured wall in engagement with said outwardly extending portions of said opposite side walls and in alignment with and spaced from the aperture therein.

10. A device for viewing transparent objects comprising a hollow box-like body having two cooperating, substantially opaque parts provided with means on adjoining edge portions of the parts for detachably securing the parts together to form the body, one part providing three hingedly connected side walls for the body and the other part providing a top wall and another side wall hingedly connected together, means connected with one of the walls of the body and constructed and arranged to engage and to support illuminating means disposed within the body, one side wall having an aperture through which light passes from the interior of the body, opposite side walls adjoining said one side wall of the body having portions extending outwardly beyond the outer face of said one side wall, and means on the outside of the body providing a support for the lower portion of a transparent object outside said one side wall and in alignment with the aperture therein and free of connection with said body, said object resting against the outwardly extending portions of said opposite side walls to space the object from said one side wall.

11. A device for viewing transparent objects comprising a hollow box-like body having a plurality of cooperating, substantially opaque parts provided with means for detachably securing the parts together to form the body, each part providing a plurality of hingedly connected substantially plane walls for the body, means secured to one of the walls of the body and constructed and arranged to receive and support an electric light socket in a position to support an electric light bulb within the body, a side wall having an aperture through which light passes from the interior of the body, and a support for a transparent object on the outer side of said side wall in alignment with the aperture therein and free of connection with the body, said support being on the body at the lower portion only thereof and extending outwardly beyond the outer face of said side wall.

12. A device for viewing transparent objects comprising a hollow box-like body having a plurality of cooperating, substantially opaque parts provided with means for detachably securing the parts together to form the body, each part providing a plurality of hingedly connected substantially plane walls for the body, means having a part constructed and arranged to engage a wall defining an opening in one of the walls of the body and another part constructed and arranged to engage an electric light bulb to support the bulb within the body, a side wall having an aperture through which light passes from the interior of the body, and a support for a transparent object on the outer side of said side wall in alignment with the aperture therein and free of connection with the body, said support being on the body at the lower portion only thereof and extending outwardly beyond the outer face of said side wall.

13. A device for viewing transparent objects comprising a hollow box-like body having a plurality of cooperating, substantially opaque parts provided with means for detachably securing the parts together to form the body, each part providing a plurality of hingedly connected substantially plane walls for the body, means having a part constructed and arranged to engage a wall defining an opening in one of the walls of the body and another part constructed and arranged to engage an electric light bulb to support the device on the bulb with the bulb located within the body, a side wall having an aperture through which light passes from the interior of the body, and a support for a transparent object on the outer side of said side wall in alignment with the aperture therein and free of connection with the body, said support being on the body at the lower portion only thereof and extending outwardly beyond the outer face of said side wall.

14. A device for viewing transparent objects comprising wall means forming a hollow body, the wall means having an aperture through which light passes from the interior of the body, supporting means on the outside of the body constructed and arranged to support a transparent object on the outside of the body in substantial alignment with said aperture, and means connected with the body for supporting the device on an electric light bulb positioned within the body.

15. A device for viewing transparent objects comprising wall means forming a hollow body, the wall means having an aperture through which light passes from the interior of the body, supporting means on the outside of the body constructed and arranged to support a transparent object on the outside of the body in substantial alignment with said aperture, means connected with the body for supporting the device on the bulb of an electric light lamp with the bulb positioned within the body, and means connected to said body and arranged to engage said lamp to prevent tilting of the device.

16. A device for viewing transparent objects comprising a hollow box-like body having two cooperating, substantially opaque parts provided with means on adjoining edge portions of the parts for detachably securing the parts together to form the body, one part providing three hingedly connected side walls for the body and the other part providing a top wall and another side wall hingedly connected together, one side wall being inclined with respect to the wall opposite thereto and having an aperture through which light passes from the interior of the body, and means connected to the outside of the body and disposed at the lower portion only of said one side wall and constructed to engage the lower edge portion of a transparent object for supporting the object on the body in alignment with the aperture in said one side wall and free of connection with said body.

17. A device for viewing transparent objects comprising a hollow box-like body having a plurality of cooperating, substantially opaque parts provided with means on adjoining edge portions of the parts for detachably securing the parts together to form the body, each part providing a plurality of hingedly connected substantially plane walls for the body, one side wall having an aperture through which light passes from the interior of the body, and means connected to the outside of the body and disposed at the lower portion only of said one side wall and constructed to engage the lower edge portion of a transparent object for supporting the object on the body in alignment with the aperture in said one side wall and free of connection with said body.

18. A device for viewing transparent objects comprising a hollow box-like body having a plurality of cooperating, substantially opaque parts provided with means on adjoining edge portions of the parts for detachably securing the parts together to form the body, each part providing at least one substantially plane wall for the body, one side wall having an aperture through which light passes from the interior of the body, and means connected to the outside of the body and disposed at the lower portion only of said one side wall and constructed to engage the lower edge portion of a transparent object for supporting the object on the body in alignment with the aperture in said one side wall and free of connection with said body.

19. A device for viewing transparent objects comprising a hollow box-like body having a plurality of cooperating, substantially opaque parts provided with means on adjoining edge portions of the parts for detachably securing the parts together to form the body, each part providing at least one substantially plane wall for the body, a side wall having an aperture through which light passes from the interior of the body, light diffusing means covering said aperture, and a support for a transparent object on the outer side of said side wall in alignment with the aperture therein and free of connection with the body, said support being on the body at the lower portion only thereof and extending outwardly beyond the outer face of said side wall.

WILLIAM N. DE SHERBININ.